US011574101B2

(12) United States Patent
Whitty et al.

(10) Patent No.: US 11,574,101 B2
(45) Date of Patent: Feb. 7, 2023

(54) TECHNIQUES FOR PROVIDING OPTIMIZATIONS BASED ON CATEGORIES OF SLACK IN TIMING PATHS

(71) Applicant: Intel Corporation, Santa Clara, CA (US)

(72) Inventors: Scott Whitty, Toronto (CA); Mahesh A. Iyer, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 2 days.

(21) Appl. No.: 17/213,021

(22) Filed: Mar. 25, 2021

(65) Prior Publication Data
US 2021/0216692 A1    Jul. 15, 2021

(51) Int. Cl.
*G06F 30/30*      (2020.01)
*G06F 30/337*     (2020.01)
*G06F 30/392*     (2020.01)
*G06F 111/04*     (2020.01)
*G06F 119/12*     (2020.01)

(52) U.S. Cl.
CPC .......... *G06F 30/337* (2020.01); *G06F 30/392* (2020.01); *G06F 2111/04* (2020.01); *G06F 2119/12* (2020.01)

(58) Field of Classification Search
CPC .. G06F 30/337; G06F 30/392; G06F 2111/04; G06F 2119/12; G06F 2119/06; G06F 30/3312
See application file for complete search history.

(56) References Cited

U.S. PATENT DOCUMENTS

| | | | |
|---|---|---|---|
| 6,090,150 A * | 7/2000 | Tawada | G06F 30/394 703/19 |
| 8,572,532 B1 | 10/2013 | Singh et al. | |
| 9,330,216 B2 | 5/2016 | Parnami et al. | |
| 9,483,597 B1 | 11/2016 | Das et al. | |
| 10,296,700 B1 * | 5/2019 | Bai | G06F 30/394 |
| 2015/0121328 A1 * | 4/2015 | Segal | G06F 30/398 716/113 |

OTHER PUBLICATIONS

"Intel® Quartus® Prime Pro Edition User Guide: Timing Analyzer," Intel Corporation, pp. 1-123, Feb. 22, 2021.

* cited by examiner

*Primary Examiner* — Jack Chiang
*Assistant Examiner* — Brandon Bowers
(74) *Attorney, Agent, or Firm* — InventIQ Legal LLP; Steven J. Cahill

(57) ABSTRACT

Systems and methods are provided for using an integrated circuit design tool to analyze timing requirements of a circuit design for an integrated circuit. A slack is calculated for a timing path in the circuit design that fails to satisfy a timing constraint. The slack is decomposed into multiple categories of delays in the timing path. The categories of delays for the slack may include intrinsic margin, clock skew, logic delay, and fabric interconnect delay. The logic delay may include local interconnect delay and logic circuit delay. The fabric interconnect delay may include delays in interconnect elements that are used to make connections between larger blocks of the logic circuits. Different optimization strategies are provided to solve the timing constraint failure for each of the different categories of slack breakdown. Slack profiles of the entire design in each of the four categories of slack are also provided.

20 Claims, 10 Drawing Sheets

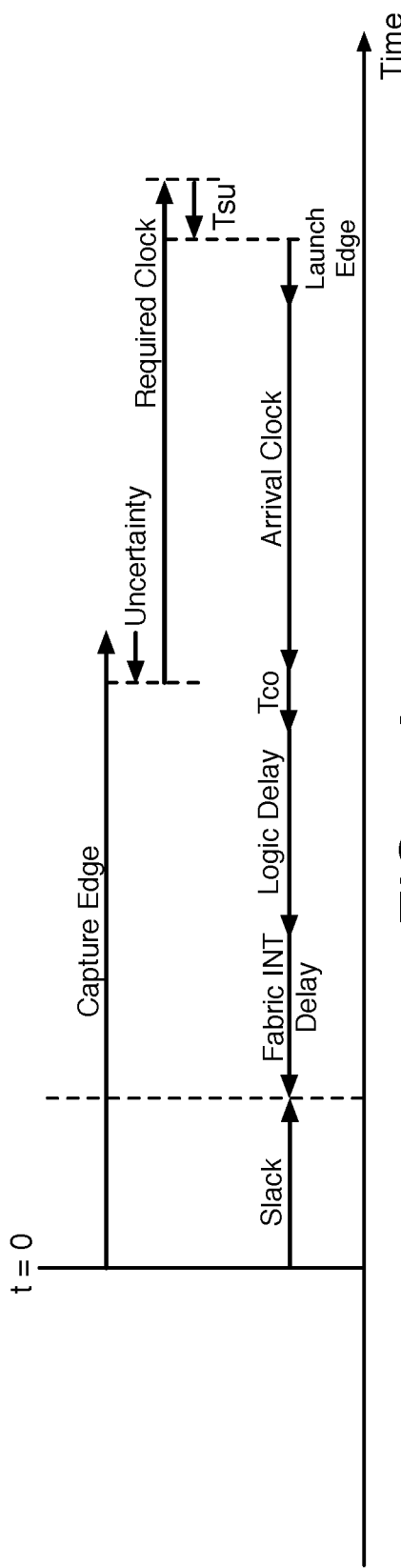
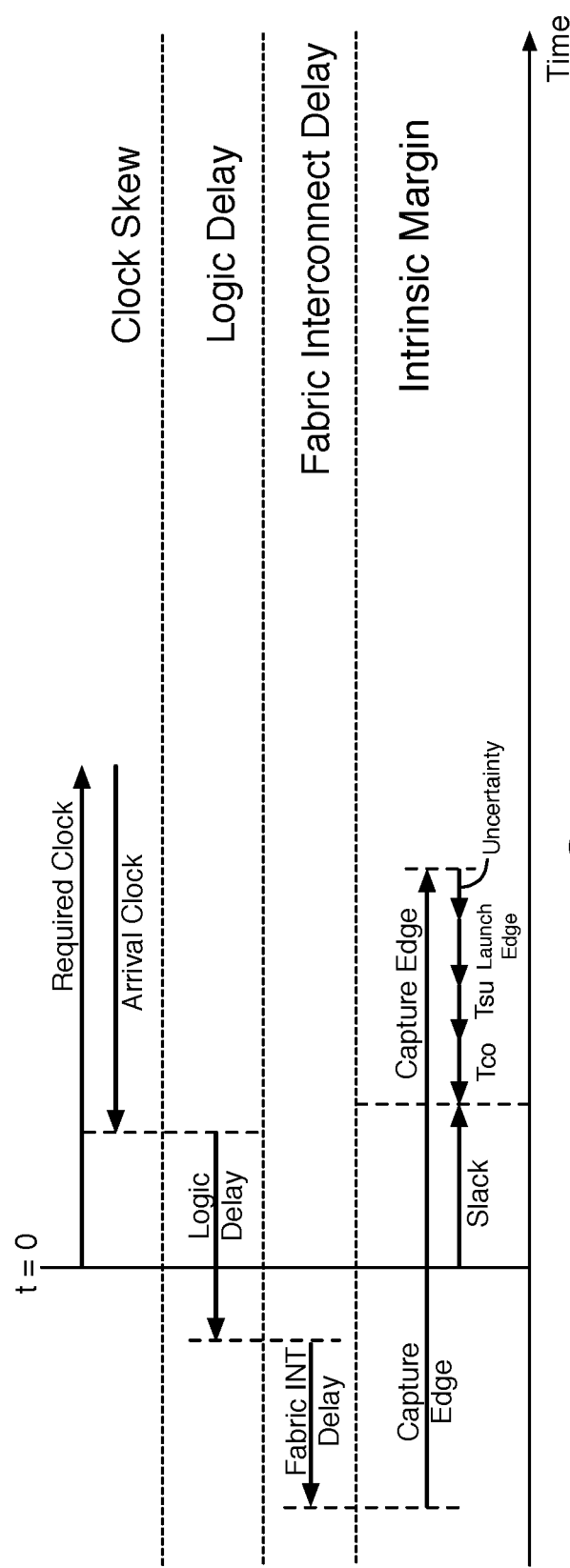
FIG. 2A
FIG. 2B

Report for Timing Path 1

| Property | Value |
|---|---|
| Intrinsic Margin | 1.747 |
| By Non-Intrinsic Values [A-B+C+D] | — |
| [A] Slack | -6.356 |
| [B] Clock Skew | -0.311 |
| [C] Logic Delay | 0.000 |
| [D] Interconnect Delay [=a+b] | 7.792 |
| [a] Local Interconnect Delay | 0.182 |
| [b] Fabric Interconnect Delay | 7.610 |
| By Intrinsic Values [A+B-C-D] | — |
| [A] Clock Edge Relationship [=a-b] | 2.001 |
| [a] Capture Edge Time | 2.001 |
| [b] Launch Edge Time | 0.000 |
| [B] Clock Uncertainty | -0.030 |
| [C] Tco | 0.315 |
| [D] Tsu | -0.091 |

FIG. 5A

Report for Timing Path 2

| Property | Value |
|---|---|
| Intrinsic Margin | -3.160 |
| By Non-Intrinsic Values [A-B+C+D] | — |
| [A] Slack | -6.160 |
| [B] Clock Skew | 1.894 |
| [C] Logic Delay | 0.000 |
| [D] Interconnect Delay [=a+b] | 4.894 |
| [a] Local Interconnect Delay | 0.131 |
| [b] Fabric Interconnect Delay | 4.763 |
| By Intrinsic Values [A+B-C-D] | — |
| [A] Clock Edge Relationship [=a-b] | 0.001 |
| [a] Capture Edge Time | 2.001 |
| [b] Launch Edge Time | 2.000 |
| [B] Clock Uncertainty | -3.000 |
| [C] Tco | 0.198 |
| [D] Tsu | -0.037 |

FIG. 5B

| Rule | Violations |
|---|---|
| Paths failing setup analysis with intrinsic margin below threshold | 6 |
| Paths failing setup analysis with large fabric interconnect delay | 2 |
| Paths failing setup analysis with large clock skew | 0 |
| Paths failing setup analysis with large logic delay | 0 |

Paths With Intrinsic Margin Below Threshold

Status: Fail

Severity: Medium

Number of violations: 6

Rule parameters: maximum violations = 500

Threshold T = 0.2

| | Slack | From Node | To Node | Intrinsic Margin |
|---|---|---|---|---|
| 1 | -7.537 | b_to_a regs[1] | b_to_a regs[2] | -3.250 |
| 2 | -7.430 | a_to_b regs[2] | a_to_b regs[3] | -3.248 |
| 3 | -7.427 | a_to_b regs[0] | a_to_b regs[1] | -3.225 |
| 4 | -6.160 | a_to_b regs[1] | a_to_b regs[2] | -3.160 |
| 5 | -5.753 | b_to_a regs[2] | b_to_a regs[3] | -3.153 |
| 6 | -6.121 | b_to_a regs[0] | b_to_a regs[1] | -3.138 |

Violation message:
[Slack]: Setup slack for timing path [From node]: start point of timing path (input ports or launch register) [To Node]: End point of timing path (capture register or output port) [Intrinsic margin]: Setup slack ignoring logic delay, interconnect delay, and clock skew [Worst-case corner]: Worst-case timing corner for this timing path Description:
Violations of this rule identify paths with an "intrinsic margin" less than T. Timing paths may fail setup analysis without any contributions from logic delay, interconnect delay, or clock skew.

FIG. 6

TECHNIQUES FOR PROVIDING OPTIMIZATIONS BASED ON CATEGORIES OF SLACK IN TIMING PATHS

FIELD OF THE DISCLOSURE

The present disclosure relates to the design of electronic integrated circuits, and more particularly, to techniques for providing optimizations based on categories of slack in timing paths that are in circuit designs for integrated circuits.

BACKGROUND

Designers of programmable logic integrated circuits, such as field programmable gate arrays (FPGAs), spend a substantial amount of time performing timing closure. Timing closure refers to the process of ensuring timing constraints of a circuit design are satisfied in a programmable logic integrated circuit that is configured according to the circuit design. Timing closure is often a time consuming task that may require a deep understanding of the FPGA hardware and computer aided design (CAD) algorithms. Discerning which optimizations to perform in a circuit design to close timing can be exceptionally difficult.

BRIEF DESCRIPTION OF THE DRAWINGS

FIG. 2A is a timing diagram that shows each of the delays in the first and second portions of the timing path shown in FIG. 1, according to an embodiment.

FIG. 2B is a timing diagram that shows each of the delays in the first and second portions of the timing path shown in FIG. 1 grouped according to categories of delays, according to an embodiment.

FIGS. 5A-5B illustrate examples of reports generated using the 4 categories of delay in the intrinsic margin formulation, according to an embodiment.

FIG. 6 illustrates an example of an output report using design rule checks and the components of the slack calculation that are grouped into 4 categories, according to an embodiment.

DETAILED DESCRIPTION

Figure 1:
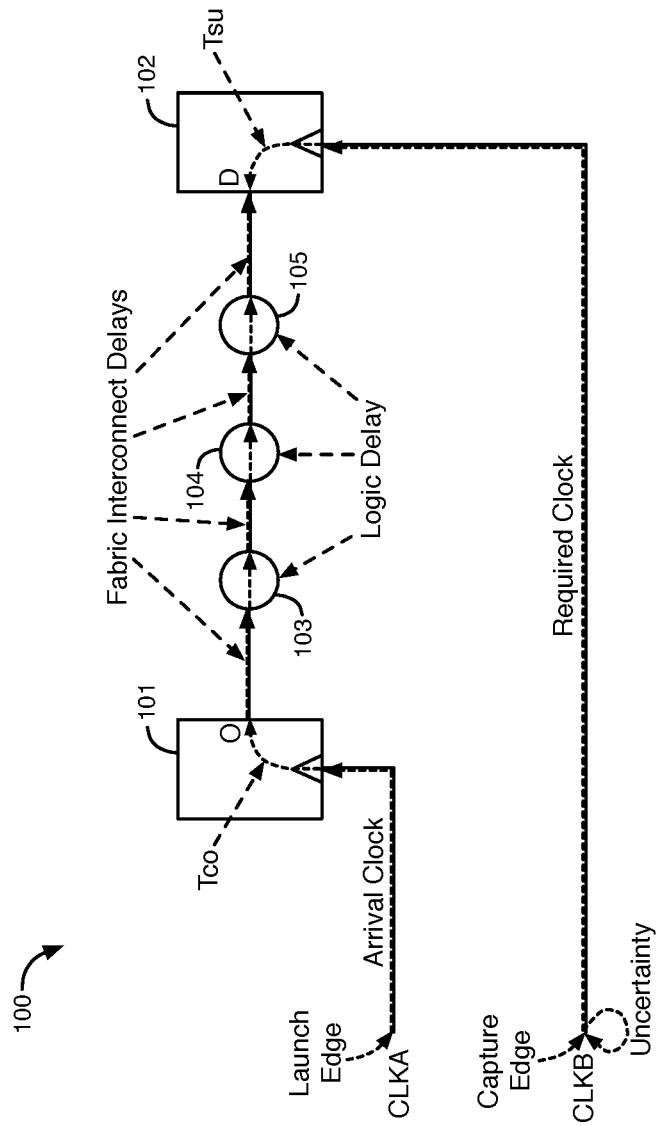
FIG. 1 illustrates a timing path through an exemplary circuit design for an integrated circuit (IC) that may contain slack, according to an embodiment.

Computer aided design (CAD) tools for field programmable gate arrays (FPGAs) typically generate timing path reports that summarize various statistics about one or more timing paths in FPGA circuit designs. These tools often generate a large amount of data for users to comb through in search of a problem in their FPGA circuit design. The reports may be very detailed or provide various high-level statistics that are computed from low-level data. The tools may also generate reports that include Design Rule Checks (DRCs) or other types of automated checks that guess at what the problem might be for a given failing timing path in an FPGA circuit design by comparing statistics against a heuristic or parameterizable threshold and describing to a user how to control or optimize the particular metric being checked.

A major disadvantage of the existing reports (both path-based and DRC-based reports) is the specificity of their analyses. Each existing report tends to focus on or summarize a single aspect of a timing path. The existing reports taken together can overwhelm a user with an enormous amount of data, rather than walking a user through a simple and comprehensive triage of failed timing requirements. A large amount of detailed data is often only useful if a user already knows what to look for in the data. Still missing from pre-existing reports is the ability to generate a comprehensive, mathematically-sound overview of a timing path that a user can leverage to quickly triage all manner of timing paths and discern which types of problems to identify and which optimizations to apply. Thus, it is critical that FPGA CAD tools present timing failures in a digestible and easy-to-understand fashion, and provide clear and actionable next-steps in order for the user to quickly triage a failing timing path in the circuit design.

According to some embodiments disclosed herein, systems and methods are provided for analyzing and debugging timing failures in a circuit design for an integrated circuit (IC), such as a programmable logic IC. According to these techniques, a value for slack may be calculated for each timing path in a circuit design for an IC that fails to satisfy a timing constraint (i.e., a timing requirement). The slack may, for example, apply to long-path analysis of setup and recovery times for logic circuits. Slack indicates if timing constraints of a timing path in circuit design are satisfied. A positive slack indicates that the timing constraints are satisfied with extra time to spare. Zero slack indicates that the timing constraints are satisfied with no extra time to spare. A negative slack indicates that one or more of the timing constraints are not satisfied.

The terms of the slack calculation for each timing path that fails one or more timing constraints are decomposed and triaged into one or more of 4 distinct categories. These 4 distinct categories are (1) intrinsic margin, (2) clock skew, (3) logic delay, and (4) fabric interconnect delay. The system provides the user with a unique set of optimizations that the user can consider implementing to address the timing failures for each of these 4 categories. Various reports and interactive investigation tools are derived from using these 4 categories. Users can use these reports and interactive investigation tools to analyze their circuit designs and understand the timing failures at a high level.

These 4 categories provide users with simple and complete information that can be used for diagnosing timing failures in circuit designs for ICs, including programmable logic ICs. The timing analysis performed using these 4 categories can identify problems for a given timing path, so that a user can focus in on specific problems and specific solutions much faster than using only pre-existing CAD reporting tools. Rather than relying on several independent metrics, using intrinsic margin provides a systematic approach to focus on one of 4 categories that cover all cases and provide clear direction to users. As a result, users can have confidence that they are headed in a promising direction as they begin their investigation into a timing failure.

Designers of programmable logic integrated circuits spend much of their time in optimization loops centered around timing closure of a feature-complete logic core or system design, usually focusing on setup or recovery analysis. The essential task during this timing closure process is to detect, analyze, and triage timing failures and then decide on an action the user can perform to address the timing failures. Because timing failures are characterized by a negative slack, timing closure work is tightly coupled to the various delays and constraints that are aggregated in the slack computation. Some of these delays are primarily influenced by the CAD flow that implemented the timing path, other ones of these delays are controlled implicitly by the implementation of the programmable logic IC, and still other ones of these delays are set by the user via design constraints. A key observation is how each of these delays and constraints, if proven problematic, may be addressed by a different set of optimizations and procedures.

According to some embodiments disclosed herein, all the components of the slack in a timing path are binned into one of four categories in an intrinsic margin formulation. The intrinsic margin formulation takes a systematic, mathematical approach to decomposing the slack in a timing path into separate categories that are selected according to the unique properties and optimization procedures associated with the component delays in the timing path.

FIG. 1 illustrates a timing path through an exemplary circuit design for an integrated circuit (IC) that may contain slack, according to an embodiment. The IC may, for example, be a programmable logic IC or another type of IC. FIG. 1 illustrates a portion 100 of the circuit design that includes two flip-flops 101-102 and three logic circuits 103-105. Flip-flops 101-102 are sequential logic circuits driven by clock signals CLKA and CLKB, respectively. The data input to flip-flop 101 and the data output of flip-flop 102 are not shown in FIG. 1. Logic circuits 103-105 may be, for example, combinatorial circuits, such as look-up tables.

FIG. 1 shows a timing path having two portions. Each of the two portions of the timing path of FIG. 1 begins with a clock signal. The first portion of the timing path in FIG. 1 is shown by the dotted arrows from the launch edge of clock signal CLKA through flip-flop 101 and logic circuits 103-105. The second portion of the timing path in FIG. 1 is shown by the dotted arrows from the capture edge of clock signal CLKB through flip-flop 102. Each of the dotted arrows in the first and second portions of the timing path represents a different delay in the respective timing path. In some embodiments, clock signals CLKA and CLKB may be generated from the same clock source. In other embodiments, clock signals CLKA and CLKB may be generated from different clock sources, such as in cross-clock transfers.

The delays in the first portion of the timing path include the delay for the launch edge of clock signal CLKA to occur, the arrival clock time for the launch edge of CLKA to reach the clock input of flip-flop 101, the time (Tco) for flip-flop 101 to capture data at its data input after receiving the launch edge of CLKA, the logic delay through each of the logic circuits 103-105, and the 4 fabric interconnect delays between the output O of flip-flop 101, logic circuits 103-105, and the data input D of flip-flop 102, as shown in FIG. 1. The delays in the second portion of the timing path include the delay for the capture edge of clock signal CLKB to occur, uncertainty in the capture edge of CLKB, the required clock time for the capture edge of CLKB to reach flip-flop 102, and the set-up time (Tsu) for flip-flop 102 (i.e., the minimum time required for the data at the data input D of flip-flop 102 to be stable before an edge in CLKB for flip-flop 102 to capture data at data input D). The uncertainty in the capture edge of clock signal CLKB is the uncertainty in when the capture edge of CLKB will enter the CLKB clock network relative to the launch edge time of CLKA. In some embodiments, the uncertainty in the capture edge of CLKB may also include any uncertainty in when the launch edge of CLKA enters the CLKA clock network. The arrival clock time and the required clock time may also include uncertainties in the delays for the edges of CLKA and CLKB to reach flip-flops 101-102, respectively.

FIG. 2A is a timing diagram that shows each of the delays in the first and second portions of the timing path shown in FIG. 1, according to an embodiment. In FIG. 2A, the delays are organized according to each portion of the timing path, such that the delays in the first portion of the timing path are grouped together, and the delays in the second portion of the timing path are grouped together. FIG. 2A shows the delays in the second portion of the timing path grouped together including the capture edge for CLKB, uncertainty in CLKB, the required clock time for CLKB, and the set-up time Tsu for flip-flop 102. FIG. 2A also shows the delays in the first portion of the timing path grouped together as the launch edge for CLKA, the arrival clock time for CLKA, the data capture time Tco for flip-flop 101 after the launch edge of CLKA, the logic delays of logic circuits 103-105, and the fabric interconnect (INT) delay between the output O of flip-flop 101 and the data input D of flip-flop 102. The sum of the delays in the timing path is the slack. In the slack calculation, the delays indicated by the right pointing arrows in FIG. 2A are added, and the delays indicated by the left pointing arrows in FIG. 2A are subtracted.

FIG. 2B is a timing diagram that shows each of the delays in the timing path shown in FIG. 1 grouped according to categories of delays, according to an embodiment. In FIG. 2B, the delays of the timing path of FIG. 1 are grouped into 4 categories, instead of being grouped according to portions of the timing path as in the timing diagram of FIG. 2A. The 4 categories of delays in the timing path in FIG. 2B are (1) clock skew, (2) logic delay, (3) fabric interconnect delay, and (4) intrinsic margin, as shown in FIG. 2B. The clock skew delay (1) includes the required clock time for clock signal CLKB and the arrival clock time for clock signal CLKA. The logic delay (2) includes the logic delays of logic circuits 103, 104, and 105. The fabric interconnect delay (3) includes the fabric interconnect (INT) delay between the output O of flip-flop 101, the inputs and outputs of logic circuits 103-105, and the data input D of flip-flop 102, as shown in FIG. 1. The intrinsic margin delay (4) includes the delay for the capture edge of CLKB to occur, the uncertainty in CLKB, the delay for the launch edge of CLKA to occur, the set-up time (Tsu) for flip-flop 102, and the data capture time (Tco) for flip-flop 101. The intrinsic margin delays include delays from the first and second portions of the timing path of FIG. 1.

The slack of the timing path is calculated by adding or subtracting each of the delays in the four categories shown in FIG. 2B. The right pointing arrows in FIG. 2B indicate delays that are added in the slack calculation, and the left pointing arrows in FIG. 2B indicate delays that are subtracted in the slack calculation. The right pointing arrows in FIG. 2B represent delays that increase the slack, and the left pointing arrows in FIG. 2B represent delays that decrease the slack. The slack is positive in the example of FIG. 2B.

In the embodiments of FIGS. 1-6, the slack calculation may only be applicable to long-path analysis for set-up or recovery times for logic circuits. A different slack calculation may be used for short-path analysis for hold or removal times for logic circuits. For short-path analysis, the slack may be calculated using a different equation. Long-path analysis may require reducing delays to satisfy setup and recovery timing requirements, and short-path analysis may require increasing delays to satisfy hold and removal timing requirements.

Conventionally, the delay through logic circuits (e.g., lookup tables in an FPGA) on a timing path is referred to as cell delay, and the delay through interconnect elements on the timing path is referred to as interconnect delay. However, different types of interconnect in an integrated circuit (IC) typically have different characteristics. In order to make the categories described above as useful as possible for timing analysis, interconnect delay is divided into local interconnect delay and fabric interconnect delay. Then, the local interconnect delay and the cell delay are combined into the logic delay category, and the fabric interconnect delay is used as a separate category.

In some exemplary embodiments, local interconnect is defined as interconnect elements (e.g., wires/conductors and interconnect circuitry such as multiplexers and buffers) that are required (and thus always present) when connecting the logic circuits in a timing path together. The delay of the local interconnect and the delay of the logic circuits both impact the delay on a timing path within a logic block. In some embodiments, a user can only affect local interconnect by affecting the logic circuits that the local interconnect is connected to. Even if the logic circuits in a timing path are perfectly placed and routed on the IC, the total delay of the local interconnect remains relatively constant. Local interconnect typically does not include global interconnect or regional interconnect on the IC.

In some exemplary embodiments, fabric interconnect is defined as interconnect elements (e.g., wires/conductors and interconnect circuitry such as multiplexers and buffers) that are used to make connections between larger blocks of logic circuits. Fabric interconnect may, for example, include global interconnect and regional interconnect on an IC. Fabric interconnect may be modified to resolve routing congestion, for example, using placement and routing techniques for a programmable logic IC. According to various embodiments, fabric interconnect elements are optimized using a different set of procedures than the procedures that are used to optimize the logic circuits and local interconnect. Therefore, fabric interconnect delay is addressed differently than the logic delay in the intrinsic margin formulation embodiments disclosed herein.

Figure 3:
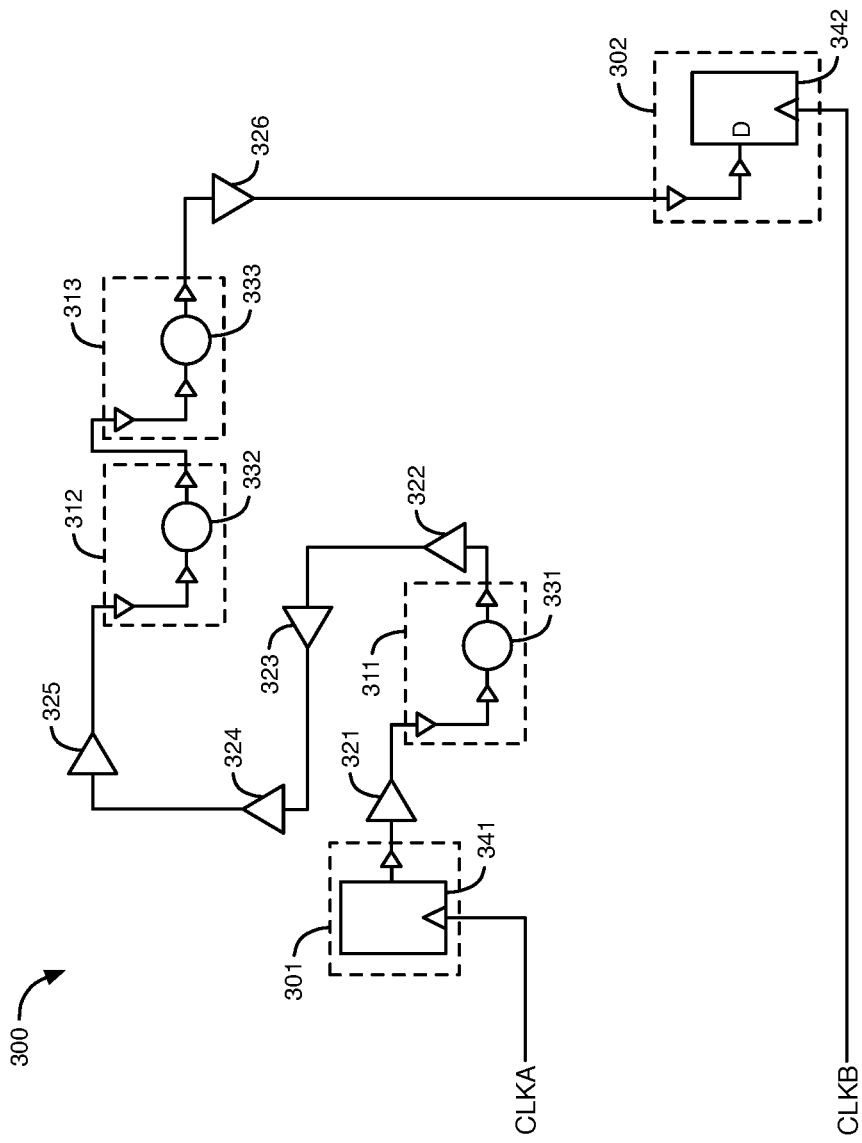
FIG. 3 illustrates examples of local interconnect, fabric interconnect, logic circuits, and logic delay, according to another embodiment.

FIG. 3 illustrates examples of local interconnect, fabric interconnect, logic circuits, and logic delay in a timing path, according to another embodiment. In FIG. 3, the timing path passes through flip-flop 341, logic circuits 331-333, and the local and fabric interconnect between flip-flop 341, logic circuits 331-333, and flip-flop 342. Local interconnect in FIG. 3 is illustrated as small triangles, and the fabric interconnect in FIG. 3 is illustrated as large triangles 321-326. The delay in the portion of the timing path that starts from CLKA includes the launch edge of CLKA, the arrival time of CLKA, the data capture Tco delay of flip-flop 341, the delay through the local interconnect in the logic block 301 that includes flip-flop 341, the delay through each of the logic circuits 331-333, the delay through the local interconnect in the logic blocks 311-313 that include logic circuits 331-333, respectively, and that are in the timing path, the delay through each of the fabric interconnect circuits 321-326, and the delay through the local interconnect in the logic block 302 to the data input D of flip-flop 342. In the embodiment of FIG. 3, the delays of the local interconnects in logic blocks 301-302 and 311-313 that are in the timing path and the delays through logic circuits 331-333 are included in the logic delay category of the intrinsic margin formulation. The delays of the fabric interconnect circuits 321-326 that are between and couple together the logic blocks 301-302 and 311-313 in the timing path are included in the fabric interconnect delay category of the intrinsic margin formulation. The delay through flip-flop 341 is the data capture time Tco.

Figure 4:
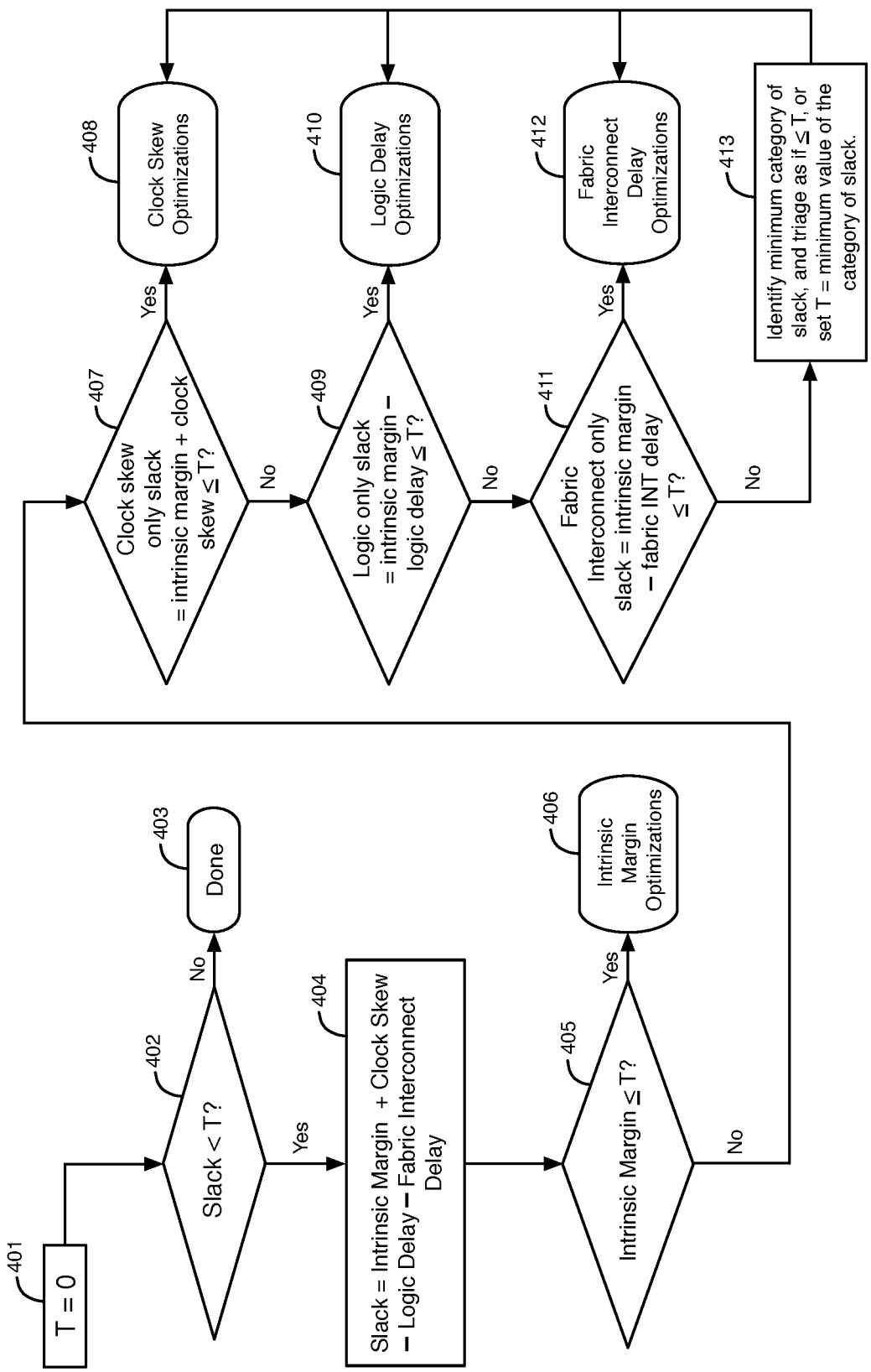
FIG. 4 is a flow chart that illustrates examples of operations that may be performed to provide suggestions of optimizations that a user can consider implementing to address timing failures in a circuit design for an integrated circuit, according to an embodiment.

FIG. 4 is a flow chart that illustrates examples of operations that may be performed to provide suggestions of optimizations that a user can consider implementing to address timing failures in a circuit design for an integrated circuit, according to an embodiment. Initially, a timing path is identified as failing one or more timing constraints. Once a failing timing path is identified, the 4 categories of the components of the slack in the timing path (e.g., intrinsic margin, clock skew, logic delay, and fabric interconnect delay) can be used together in a systematic triage procedure. Optimizations to the circuit design are suggested to the user based on these 4 categories.

In operation 401, a threshold T is defined for a timing failure in a timing path in a circuit design for an integrated circuit. In the example of FIG. 4, the threshold T is defined as T=0 in operation 401. The integrated circuit (IC) may be any type of integrated circuit, such as a programmable logic IC, a processor, or an application specific IC. In operation 402, the slack of the timing path of operation 401 is determined (e.g., calculated), and a determination is made whether the slack of the timing path is less than the threshold T (i.e., Slack <T). If the slack is ≥T, then the procedure of FIG. 4 terminates in operation 403. If the slack is <T, then the timing path has failed one or more timing constraints, and the procedure of FIG. 4 proceeds to operation 404. In operation 404, the slack of the timing path that has failed the one or more timing constraints (i.e., the failed timing path) is decomposed into the 4 categories, such that the slack=intrinsic margin+clock skew−logic delay−fabric interconnect delay.

Then, in operation 405, a determination is made whether the intrinsic margin of the failed timing path is ≤T. Given that the clock skew is generally <0 (i.e., the arrival clock delay >required clock delay), the logic delay is generally >0, and the fabric interconnect delay is generally >0, if the intrinsic margin is ≤T, then the other components of the slack calculation (i.e., clock skew, logic delay, and fabric interconnect delay) only decrease the slack value, and the delays in the intrinsic margin category alone are enough to cause the timing path to fail the timing constraint. Thus, the intrinsic margin must be improved for the timing path to pass the one or more timing constraints. As described above, the intrinsic margin is the sum of intrinsic delays including the clock edge relationship, clock source uncertainty, endpoint microparameters, etc. If the intrinsic margin of the failed timing path is T in operation 405, then intrinsic margin optimizations are suggested to the user in operation 406. The intrinsic margin optimizations suggested in operation 406 may include, for example, adjusting user or software design constraints, ensuring endpoint circuits in the timing path are configured and/or registered properly, and investigating the sources of clock signals (e.g., CLKA and CLKB) in the timing path.

If a determination is made in operation 405 that the intrinsic margin of the failed timing path is >T, then the clock skew only slack is calculated in operation 407 according to the equation: Clock Skew Only Slack=Intrinsic Margin+Clock Skew (i.e., Clock Skew Only Slack=Intrinsic Margin+Required Clock Delay−Arrival Clock Delay). The clock skew only slack is the contribution to the slack of the failed timing path that is only from the clock skew and the intrinsic margin in the intrinsic margin formulation. In operation 407, a determination is made whether the clock skew only slack of the failed timing path is the threshold T. If the clock skew only slack is ≤T in operation 407, then the clock skew must be improved for the timing path to pass the timing constraints, or the intrinsic margin needs to be increased even more. If the clock skew only slack is determined to be T in operation 407, then clock skew optimizations are suggested to the user in operation 408. The clock skew optimizations suggested to the user in operation 408 may include, for example, adjusting clock region assignments for clock signals in the timing path and redesigning cross-clock transfers (e.g., redesigning transfers of data and control signals in the timing path across clock signal domains).

If the clock skew only slack is determined to be >T in operation 407, then the logic only slack is calculated in operation 409 according to the equation: Logic Only Slack=Intrinsic Margin−Logic Delay. The logic only slack is the contribution to the slack of the failed timing path that is only from the logic delay and the intrinsic margin in the intrinsic margin formulation. In operation 409, a determination is made whether the logic only slack of the failed timing path is the threshold T. If the logic only slack is ≤the threshold T in operation 409, the logic delay must be improved for the timing path to pass the timing constraints, or the intrinsic margin needs to be increased even more. If the logic only slack is determined to be T in operation 409, then logic delay optimizations are suggested to the user in operation 410. The logic delay optimizations suggested to the user in operation 410 may include, for example, reducing logic levels, adding pipeline stages to the timing path, restructuring logic circuits in the timing path to ensure faster lookup table (LUT) inputs, and unblocking register retiming optimizations in the timing path. Reducing logic levels may refer to logic synthesis attempting to reduce the number of levels of combinational logic or the user restructuring their register-transfer level (RTL) design to help reduce such combinational logic levels. Reducing logic levels also may refer to removing redundant or unnecessary logic computations from the failed timing path. For example, reducing logic levels may involve analyzing which of the logic functions of the failed timing path are necessary computations and which of the logic functions of the failed timing path can be eliminated or moved to other timing paths, either sequentially or in parallel.

If the logic only slack is determined to be >T in operation 409, then the fabric interconnect only slack is calculated in operation 411 according to the equation: Fabric Interconnect Only Slack=Intrinsic Margin−Fabric Interconnect Delay. The fabric interconnect only slack is the contribution to the slack of the failed timing path that is only from the fabric interconnect delay and the intrinsic margin in the intrinsic margin formulation. In operation 411, a determination is made whether the fabric interconnect only slack of the failed timing path is the threshold T. If the fabric interconnect only slack is ≤threshold T in operation 411, then the fabric interconnect delay must be improved for the timing path to pass the timing constraints, or the intrinsic margin needs to be increased even more. If the fabric interconnect only slack is determined to be T in operation 411, then fabric interconnect delay optimizations are suggested to the user in operation 412. The fabric interconnect delay optimizations suggested to the user in operation 412 may include, for example, reducing routing congestion in the fabric interconnect, applying placement constraints for placing logic blocks in the IC during placement of the circuit design for the IC, and restructuring the register-transfer level (RTL) of the circuit design for the IC to enable tighter packing of the logic circuits or fabric interconnect using a hardware description language.

According to an alternative embodiment, operations 405, 407, 409, and 411 may be applied to the failed timing path in parallel, rather than sequentially as shown in FIG. 4. If more than one of the categories of the slack are ≤threshold T in two or more of operations 405, 407, 409, and 411, then optimizations are provided to the user in the corresponding operations 406, 408, 410, and 412, respectively. For example, if a determination is made that the clock skew only slack of the failed timing path is ≤T, and a determination is made that the logic only slack of the failed timing path is ≤T, then both sets of optimizations are provided to the user in operations 408 and 410. Alternatively, the intrinsic margin may be increased to allow the timing path to satisfy the timing constraints. According to another alternative embodiment, operations 405, 407, 409, and 411 may be applied to the failed timing path sequentially, but in a different order than the order shown in FIG. 4 and described herein. In some embodiments, the intrinsic margin is compared to the threshold T first in operation 405, then the other three categories of slack are compared to the threshold T in any desired order (sequentially or in parallel) in operations 407, 409, and 411, and corresponding optimizations are suggested to the user as needed.

If the fabric interconnect only slack is determined to be >T in operation 411, then the interaction between multiple components in the timing path may be causing the timing failure. In operation 413, the category of slack having the smallest value (i.e., the minimum value) is identified among the intrinsic margin, the clock skew only slack, the logic only slack, and the fabric interconnect only slack. Then, optimizations are provided to the user that correspond to the category of slack having the smallest value. Improving the smallest value among these 4 categories may be the most promising method to increase the slack in the failing timing path. This technique is equivalent to increasing T to the value of the slack category having the smallest value and performing operations 405-412 again with the new value of T.

The procedure of FIG. 4 leverages a specific mathematical definition of slack as a foundation for comparing each of the 4 delay categories against a threshold T either to identify components in the IC that provably must be fixed for a timing path to pass timing constraints or to identify components in the IC that show the most promise for optimization. The procedure of FIG. 4 provides more assistance to designers of ICs, such as FPGAs, than simply identifying a failing timing path as having a significant amount of logic delay. Instead, the procedure of FIG. 4 can be used to determine if the amount of logic delay on a failing timing path is either provably more than the intrinsic margin of the timing path, or if the logic delay of the timing path is the largest contributor to negative slack among the 4 categories identified in the intrinsic margin formulation. This extra level of verification is unique to the intrinsic margin formulation and debugging techniques compared to other reporting methodologies.

Although clock skew may usually decrease slack (i.e., clock skew <0 for setup analysis), the procedure of FIG. 4 can use beneficial clock skew to cause a timing path to pass a timing constraint. For example, the procedure of FIG. 4 can be used to employ beneficial clock skew in a timing path with an intrinsic margin below the threshold in order to pass a timing constraint. However, beneficial clock skew is usually only added to a timing path with extreme care and only in a subset of circuit topologies. Users can use beneficial clock skew in the context of intrinsic margin and the other categories of the slack calculation involved in a timing path.

Using the 4 categories of the intrinsic margin formulation, a problematic slack category can be identified, and a clear and unique set of procedures can be used to determine how the timing failure should be addressed, depending on which category of the slack failed. Table 1 illustrates a summary of the procedure of FIG. 4.

TABLE 1

| Category of Slack | Formula | Procedure if ≤ T |
|---|---|---|
| Intrinsic Margin | Sum of Intrinsic Delays (clock edge relationship, clock source uncertainty, endpoint microparameters, etc.) | Adjust design constraints, ensure endpoint blocks are configured and/or registered properly, investigate clock sources |
| Clock Skew Only Slack | Intrinsic Margin + Clock Skew (= Intrinsic Margin + Required Clock Delay − Arrival Clock Delay) | Adjust clock region assignments, redesign cross-clock transfers |
| Logic Only Slack | Intrinsic Margin − Logic Delay (= Intrinsic Margin − Cell Delay − Local Interconnect Delay) | Reduce logic levels, add pipeline stages, restructure logic to ensure faster LUT inputs, unblock register retiming optimization |
| Fabric Interconnect Only Slack | Intrinsic Margin − Fabric Interconnect Delay | Reduce routing congestion, apply placement constraints, restructure RTL to enable tighter packing |

The procedure of FIG. 4 (summarized in Table 1) demonstrates the value of the categories of the intrinsic margin formulation. Each of the categories is associated with a separate set of optimizations for users to pursue to address the timing failure. The optimizations can be provided to users in any desired format, e.g., in a graphical user interface or text-based report. Also, the procedure of FIG. 4 can give users confidence of the magnitude of the timing issues they are endeavoring to address. The techniques disclosed herein can be used to generate detailed reports that inform users of precise measurements of delays along the timing path that are grouped according to the 4 categories. The reports are substantially more useful given that users know what types of delays they are trying to address.

FIGS. 5A-5B illustrate examples of reports generated using the 4 categories of delay in the intrinsic margin formulation, according to an embodiment. The reports of FIGS. 5A-5B include exemplary values (e.g., in nanoseconds) for the intrinsic margin in two different timing paths 1 and 2 in a circuit design for an IC. The reports of FIGS. 5A-5B also include exemplary values for the components of the slack calculation in the 4 categories for the two timing paths. In the exemplary reports of FIGS. 5A-5B, the components of the slack calculation are organized by intrinsic margin values and by non-intrinsic margin values. The non-intrinsic margin values include the slack, clock skew, logic delay, and the fabric and local interconnect delays. The intrinsic margin=slack−clock skew+logic delay+interconnect delay. In both exemplary reports of FIGS. 5A-5B, the slack is negative indicating timing constraints have been violated. The intrinsic values include the clock edge relationship (which equals the capture edge time [a] minus the launch edge time [b]), the clock uncertainty (e.g., of CLKB), the data capture time Tco (e.g., for flip-flop 101), and the set-up time Tsu (e.g., for flip-flop 102). The intrinsic margin=the clock edge relationship+the clock uncertainty−Tco−Tsu.

As shown, for example, in FIGS. 5A-5B, reports generated using embodiments disclosed herein can include information about any components of the slack calculation of a timing path, for example, the intrinsic margin, clock skew, logic delay, and/or fabric interconnect delay. The information for the timing paths in the reports can be sorted by slack or any of the categories or components of the slack calculation. The timing paths in the reports can be organized by any of the 4 categories of the intrinsic margin formulation (clock skew, logic delay, fabric interconnect delay, and intrinsic margin) or any subcomponents of these 4 categories, pulling out the most applicable timing paths for each metric across the entire circuit design explicitly. Because the foundation of the intrinsic margin formulation is mathematically sound, simple, easy to understand, and actionable in its feedback to users, numerous flows and reports can be generated to help guide and accelerate users of CAD tools through the early stages of timing closure triage of circuits designs for ICs.

In some embodiments, design rule checks (DRCs) are included as part of the design flow to help automate the triage work of computing the components of the slack calculations for different timing paths and comparing these components to a parameterizable threshold. FIG. 6 illustrates an example of an output report using design rule checks and the components of the slack calculation that are grouped into the 4 categories described above, according to an embodiment. The left half of the report of FIG. 6 illustrates the number of timing paths in a circuit design for an IC that fail the setup analysis with intrinsic margin below the threshold T relative to a set of DRCs. The left half of the report of FIG. 6 also illustrates the number of timing paths in the circuit design that fail the setup analysis with large fabric interconnect delay (e.g., fabric interconnect only slack <T), the number of timing paths in the circuit design that fail the setup analysis with a large clock skew (e.g., clock skew only slack <T), and the number of timing paths in the circuit design that fail the setup analysis with a large logic delay (e.g., logic only slack <T).

The right half of the report of FIG. 6 illustrates further details about the timing paths in the circuit design that fail the setup analysis with intrinsic margin below the threshold T relative to the set of DRCs, including the status of the timing paths, the severity of the violations, the number of violations, the maximum violations allowed, and the value of the threshold T. The right half of FIG. 6 also illustrates the slack value, the intrinsic margin value, the starting node (from node), and the ending node (to node) for each of the 6 timing paths that fail the setup analysis with intrinsic margin below the threshold relative to the set of DRCs. The right half of FIG. 6 also provides a message to the user regarding details of the values provided for each of the 6 timing paths that fail the setup analysis with intrinsic margin below the threshold. The message also states that paths with an intrinsic margin less than T are violations of the rule.

The report may also provide information about any of the timing paths that fail the setup analysis because of a large fabric interconnect delay, a large clock skew, and/or a large logic delay. The report may indicate one or more of the slack, the intrinsic margin, the fabric interconnect delay, the fabric interconnect only slack, the logic delay, the logic only slack, the clock skew, and/or the clock skew only slack for the failing timing paths. The report may also include additional information about the failing timing paths. For example, the report may indicate that timing paths may fail the setup analysis without any delay contributions from logic delay, local interconnect delay, or clock skew. If these components are removed from overall slack, the remaining slack is the timing path's fabric interconnect delay, as well as the combination of clock relationship, endpoint parameters, design constraints, and other requirements. These requirements together constitute a timing path's fabric interconnect only slack. A negative fabric interconnect only slack implies that the fabric interconnect in a timing path should be reduced or the setup requirements of the fabric interconnect should be relaxed.

In some embodiments, more advanced data flows can be built on top of the intrinsic margin analysis to help guide users through the triaging process as well as discover timing paths that are failing a particular category of the slack calculation (i.e., the reverse process from triaging a timing path failure). The threshold (T) to which a user compares to the intrinsic margin and the other categories of the slack calculation is a critical parameter during the triage process. Using T=0 represents the most conservative timing check, where the intrinsic margin or the other slack categories provably must be fixed for a timing path to pass timing constraints. However, increasing threshold T above 0 helps provide a buffer for the categories of the slack calculation not being checked and reduces the risk that these categories of the slack calculation will cause the timing path to fail the timing constrains. For example, it may be good practice to ensure that the clock skew only slack is above a non-zero threshold to ensure that the timing path has enough buffer for some amount of delay along its data path.

The appropriate value to set the threshold T depends, for example, on the IC, the nature of the circuit design for the IC, the speed grade that the user is targeting for the circuit design, and each user's own heuristics and design style. An automated advisor flow can help users select a non-zero threshold to compare to the intrinsic margin and to the other categories of the slack calculation for a timing path. This automated advisor flow can involve representing average delays for various categories of the slack calculation along the timing path for a given IC and speed grade. The automated advisor flow may request a user to rate their risk tolerance for the timing paths being analyzed, and/or pool similar timing paths in the circuit design together and analyze average characteristics of the timing paths to ensure that any outlier timing paths are properly detected.

Techniques disclosed herein for analyzing timing failures in timing paths of a circuit design for an IC with the 4 categories of delays in the intrinsic margin formulation including (1) clock skew, (2) logic delay, (3) fabric interconnect delay, and (4) intrinsic margin can be used to generate various histograms, heat-maps, graphs, and hierarchical reports for outputting to a user, for example, in graphical user interfaces or in text format. The reports can show users any of the components of the slack calculation grouped according to the categories: (1) clock skew, (2) logic delay, (3) fabric interconnect delay, and (4) intrinsic margin. The reports can display any one or more components of the slack calculation grouped according to these 4 categories of delay in graphical or text format to a user. These reports help users discover timing paths in their circuit designs that exhibit particular behaviors. These reports also help users draw conclusions about the applicability and necessity of particular optimizations (e.g., as shown in Table 1) with a more directed focus than the overall slack reports generated by prior systems.

Figure 7:
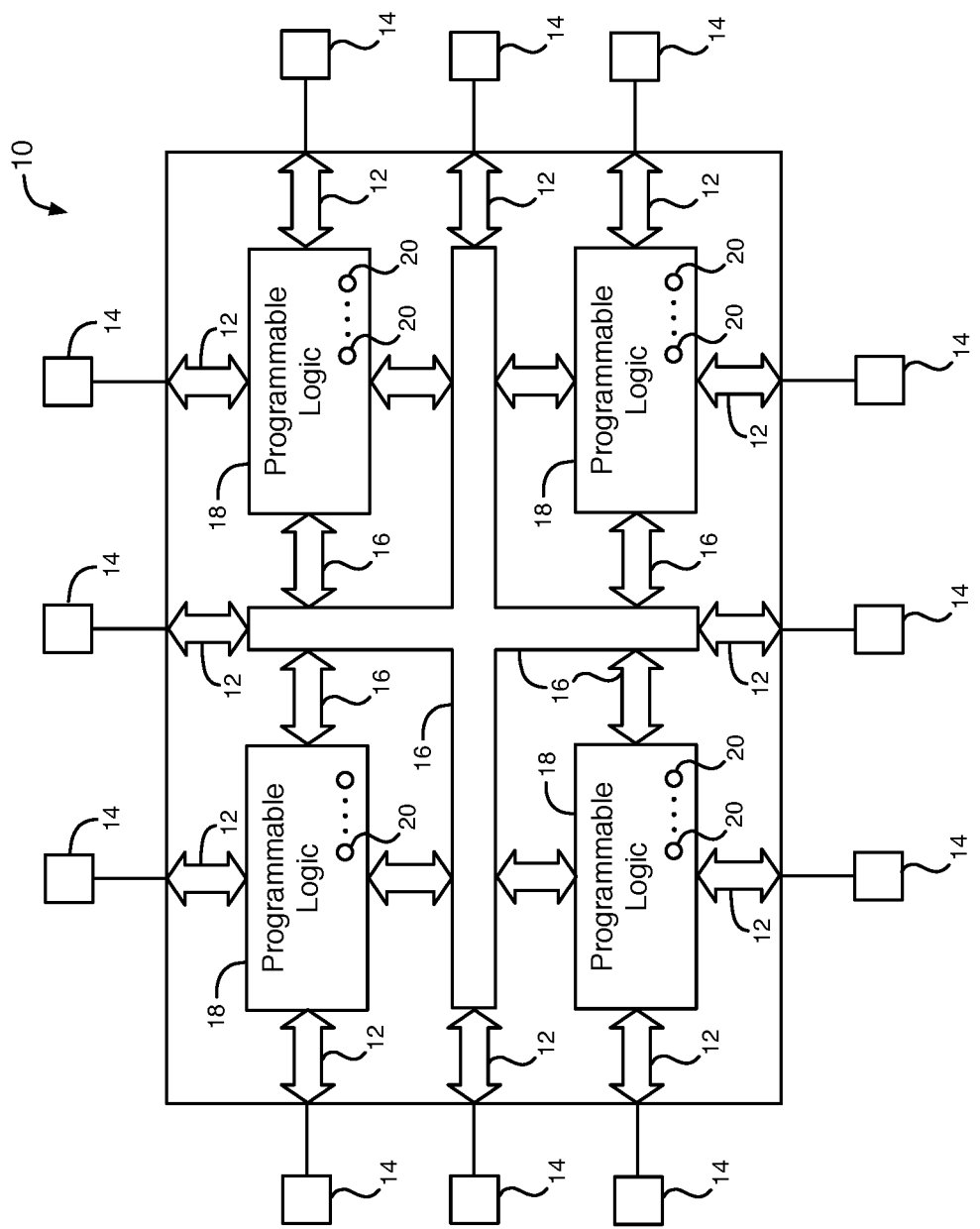
FIG. 7 is a diagram of an illustrative programmable integrated circuit in accordance with an embodiment.

An illustrative programmable logic integrated circuit (IC) 10 is shown in FIG. 7. IC 10 may, for example, include the circuitry shown in FIG. 1 or 3. As shown in FIG. 7, programmable logic integrated circuit 10 may have input-output circuitry 12 for driving signals off of IC 10 and for receiving signals from other devices via input-output pins 14. Interconnection resources 16 such as global, regional, and local vertical and horizontal conductive lines and buses may be used to route signals on IC 10. Interconnection resources 16 include fixed interconnects (conductive lines) and programmable interconnects (i.e., programmable connections between respective fixed interconnects). Programmable logic circuitry 18 may include combinational and sequential logic circuitry. The programmable logic 18 may be configured to perform custom logic functions.

Programmable logic IC 10 contains memory elements 20 that can be loaded with configuration data (also called programming data) using pins 14 and input-output circuitry 12. Once loaded, the memory elements 20 may each provide a corresponding static control output signal that controls the state of an associated logic component in programmable logic 18. Typically, the memory element output signals are used to control the gates of metal-oxide-semiconductor (MOS) transistors. In the context of programmable integrated circuits, the memory elements 20 store configuration data and are sometimes referred to as configuration random-access memory (CRAM) cells.

Figure 8:
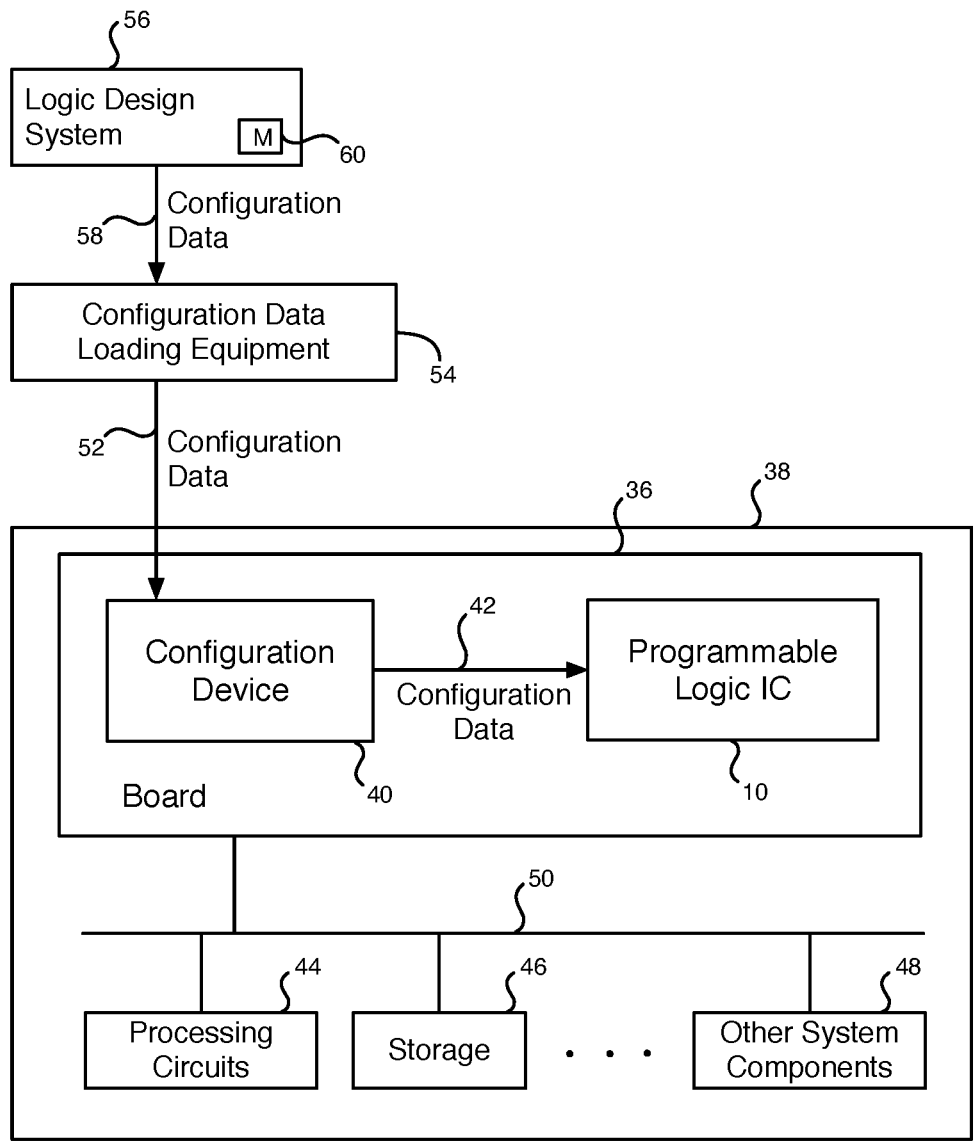
FIG. 8 is a diagram showing how configuration data is created by a logic design system and loaded into a programmable logic integrated circuit (IC) to configure the IC for operation in a system in accordance with an embodiment.

An illustrative system environment for IC 10 is shown in FIG. 8. IC 10 may be mounted on a board 36 in a system 38. In general, programmable logic IC 10 may receive configuration data from programming equipment or from other suitable equipment or device. In the example of FIG. 8, programmable IC 10 is a type of programmable logic device that receives configuration data from an associated configuration device 40. With this type of arrangement, configuration device 40 may, if desired, be mounted on the same board 36 as programmable logic IC 10.

Configuration device 40 may be an erasable-programmable read-only memory (EPROM) chip, a programmable logic device configuration data loading chip with built-in memory, or other suitable device. When system 38 boots up (or at another suitable time), the configuration data for configuring the programmable logic IC 10 may be supplied to the programmable logic IC 10 from device 40, as shown schematically by path 42. The configuration data that is supplied to the programmable logic IC 10 may be stored in the programmable logic IC 10 in its configuration random-access-memory elements 20.

System 38 may include processing circuits 44, storage 46, and other system components 48 that communicate with IC 10. The components of system 38 may be located on one or more boards such as board 36 or other suitable mounting structures or housings and may be interconnected by buses, traces, and other electrical paths 50.

Configuration device 40 may be supplied with the configuration data for IC 10 over a path such as path 52. Configuration device 40 may, for example, receive the configuration data from configuration data loading equipment 54 or other suitable equipment that stores this data in configuration device 40. Device 40 may be loaded with data before or after installation on board 36.

In the example of FIG. 8, a logic design system 56 generates the configuration data. The configuration data produced by the logic design system 56 may be provided to equipment 54 over a path such as path 58. The equipment 54 provides the configuration data to device 40, so that device 40 can later provide this configuration data to the programmable logic IC 10 over path 42. Logic design system 56 may be based on one or more computers and one or more software programs. In general, software and data may be stored on any computer-readable medium (storage) in system 56 and is shown schematically as storage 60 in FIG. 8.

In a typical scenario, logic design system 56 is used by a logic designer to create a circuit design for IC 10. The system 56 produces corresponding configuration data that is provided to configuration device 40. Upon power-up, configuration device 40 and data loading circuitry in programmable IC 10 is used to load the configuration data into memory cells 20 of IC 10. IC 10 may then be used in normal operation of system 38.

After IC 10 is initially loaded with a set of configuration data (e.g., using configuration device 40), IC 10 may be reconfigured by loading a different set of configuration data. Sometimes, it may be desirable to reconfigure only a portion of the memory cells in IC 10 via a process referred to as partial reconfiguration. As memory cells are typically arranged in an array, partial reconfiguration can be performed by writing new data values only into selected portion(s) in the array, while leaving portions of the array other than the selected portion(s) in their original state.

It can be a significant undertaking to design and implement a desired (custom) logic circuit design in a programmable logic integrated circuit (IC). Logic designers therefore generally use logic design systems based on computer-aided-design (CAD) tools to assist them in designing circuits. A logic design system can help a logic designer design and test complex circuits for a system. When a design is complete, the logic design system may be used to generate configuration data for electrically programming the appropriate programmable logic IC.

Figure 9:
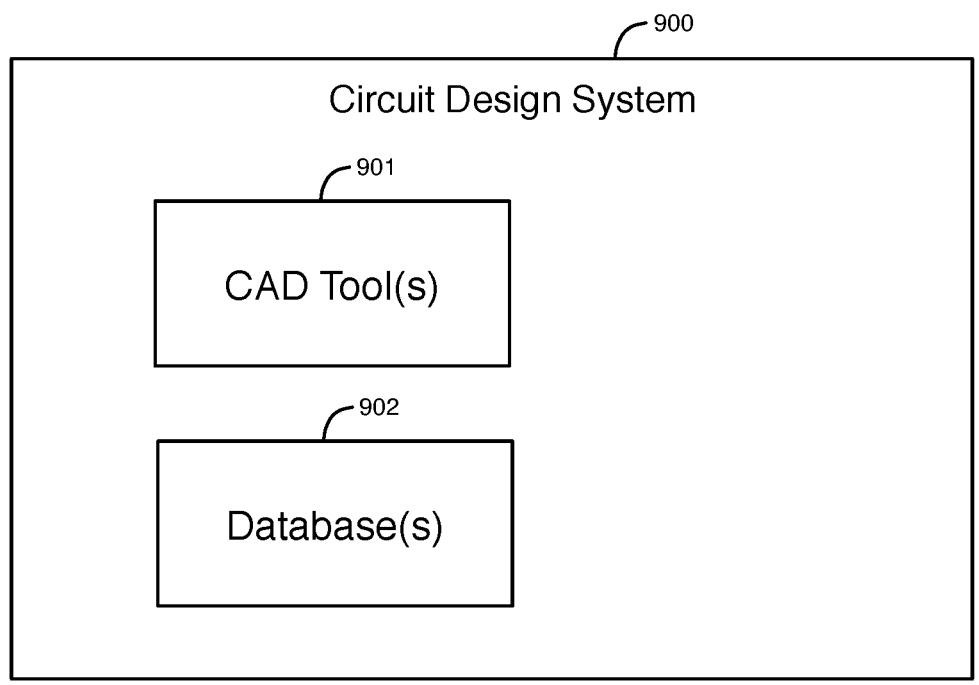
FIG. 9 is a diagram of a circuit design system that may be used to design integrated circuits in accordance with an embodiment.

An illustrative circuit design system 900 in accordance with an embodiment is shown in FIG. 9. If desired, the circuit design system of FIG. 9 may be used in a logic design system such as logic design system 56 shown in FIG. 8. Circuit design system 900 may be implemented on integrated circuit design computing equipment. Circuit design system 900 may, for example, include one or more networked computers with processors, memory, mass storage, input/output devices, etc. System 900 may, for example, be based on one or more processors such as personal computers, workstations, etc. The processor(s) may be linked using a network (e.g., a local or wide area network). Memory in these computers or external memory and storage devices may be used to store instructions and data.

Software-based components such as computer-aided design (CAD) tools 901 and databases 902 reside on system 900. During operation, executable software such as the software of computer aided design tools 901 runs on the processor(s) of system 900. Databases 902 are used to store data for the operation of system 900. In general, software and data may be stored in non-transitory computer readable storage media (e.g., tangible computer readable storage media). The software code may sometimes be referred to as software, data, program instructions, instructions, or code. The non-transitory computer readable storage media may include computer memory chips, non-volatile memory such as non-volatile random-access memory (NVRAM), one or more hard drives (e.g., magnetic drives or solid state drives), one or more removable flash drives or other removable media, compact discs (CDs), digital versatile discs (DVDs), Blu-ray discs (BDs), other optical media, and floppy diskettes, tapes, or any other suitable memory or storage device(s).

Software stored on the non-transitory computer readable storage media may be executed on system 900. When the software of system 900 is installed, the storage of system 900 has instructions and data that cause the computing equipment in system 900 to execute various methods (processes). When performing these processes, the computing equipment is configured to implement the functions of circuit design system 900.

The computer aided design (CAD) tools 901, some or all of which are sometimes referred to collectively as a CAD tool, a circuit design tool, or an electronic design automation (EDA) tool, may be provided by a single vendor or by multiple vendors. Tools 901 may be provided as one or more suites of tools (e.g., a compiler suite for performing tasks associated with implementing a circuit design in a programmable IC) and/or as one or more separate software components (tools). Database(s) 902 may include one or more databases that are accessed only by a particular tool or tools and may include one or more shared databases. Shared databases may be accessed by multiple tools. For example, a first tool may store data for a second tool in a shared database. The second tool may access the shared database to retrieve the data stored by the first tool. This allows one tool to pass information to another tool. Tools may also pass information between each other without storing information in a shared database if desired.

Figure 10:
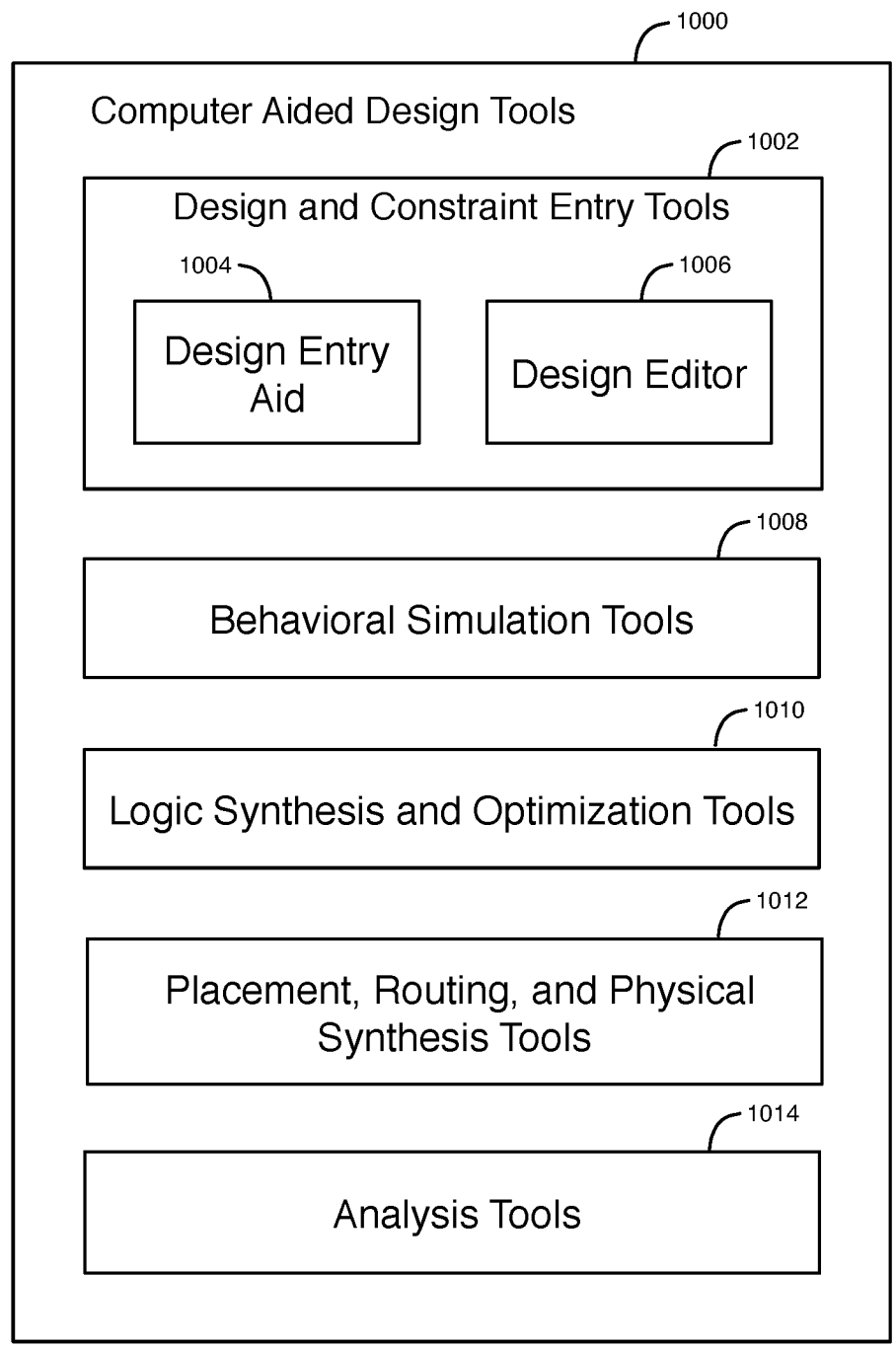
FIG. 10 is a diagram of illustrative computer-aided design (CAD) tools that may be used in a circuit design system in accordance with an embodiment.

Illustrative computer aided design tools 1000 that may be used in a circuit design system such as circuit design system 900 of FIG. 9 are shown in FIG. 10. The design process may start with the formulation of functional specifications of the integrated circuit design (e.g., a functional or behavioral description of the integrated circuit design). A circuit designer may specify the functional operation of a desired circuit design using design and constraint entry tools 1002. Design and constraint entry tools 1002 may include tools such as design and constraint entry aid 1004 and design editor 1006. Design and constraint entry aids such as aid 1004 may be used to help a circuit designer locate a desired design from a library of existing circuit designs and may provide computer-aided assistance to the circuit designer for entering (specifying) the desired circuit design. Design and constraint entry tools 1002 may allow a circuit designer to enter timing constraints for the desired circuit design through aid 1004.

As an example, design and constraint entry aid 1004 may be used to present screens of options for a user. The user may click on on-screen options to select whether the circuit being designed should have certain features. Design editor 1006 may be used to enter a design (e.g., by entering lines of hardware description language code), may be used to edit a design obtained from a library (e.g., using a design and constraint entry aid), or may assist a user in selecting and editing appropriate prepackaged code/designs.

Design and constraint entry tools 1002 may be used to allow a circuit designer to provide a desired circuit design using any suitable format. For example, design and constraint entry tools 1002 may include tools that allow the circuit designer to enter a circuit design using truth tables. Truth tables may be specified using text files or timing diagrams and may be imported from a library. Truth table circuit design and constraint entry may be used for a portion of a large circuit or for an entire circuit.

As another example, design and constraint entry tools 1002 may include a schematic capture tool. A schematic capture tool may allow the circuit designer to visually construct integrated circuit designs from constituent parts such as logic gates and groups of logic gates. Libraries of preexisting integrated circuit designs may be used to allow a desired portion of a design to be imported with the schematic capture tools.

If desired, design and constraint entry tools 1002 may allow the circuit designer to provide a circuit design to the circuit design system 900 using a hardware description language such as Verilog hardware description language (Verilog HDL), Very High Speed Integrated Circuit Hardware Description Language (VHDL), SystemVerilog, or a higher-level circuit description language such as OpenCL or SystemC, just to name a few. The designer of the integrated circuit design can enter the circuit design by writing hardware description language code with editor 1006. Blocks of code may be imported from user-maintained or commercial libraries if desired.

After the circuit design has been entered using design and constraint entry tools 1002, behavioral simulation tools 1008 may be used to simulate the functionality of the circuit design. If the functionality of the design is incomplete or incorrect, the circuit designer can make changes to the circuit design using design and constraint entry tools 1002. The functional operation of the new circuit design may be verified using behavioral simulation tools 1008 before synthesis operations have been performed using tools 1010. Simulation tools such as behavioral simulation tools 1008 may also be used at other stages in the design flow if desired (e.g., after logic synthesis). The output of the behavioral simulation tools 1008 may be provided to the circuit designer in any suitable format (e.g., truth tables, timing diagrams, etc.).

One or more timing analysis tools in design and constraint entry tools 1002 including static timing analysis tools can calculate the slack for each timing path that fails a timing constraint, decompose and triage the slack calculation into one or more of 4 categories including (1) intrinsic margin, (2) clock skew, (3) logic delay, and (4) fabric interconnect delay, and suggest optimizations that are selected based on these 4 categories for a user to consider applying to address the timing failures, according to the embodiments disclosed herein with respect to FIGS. 1-6, including the operations of FIG. 4. The timing analysis tools can generate reports like those disclosed herein with respect to FIGS. 5A, 5B, and/or 6. These reports can be generated, in certain embodiments, in response to a Tcl (Tool Command Language) command from the user or in response to a selection from the user in the design entry aid 1004 graphical user interface.

Once the functional operation of the circuit design has been determined to be satisfactory, logic synthesis and optimization tools 1010 may generate a gate-level netlist of the circuit design, for example, using gates from a particular library pertaining to a targeted process supported by a foundry that has been selected to produce the integrated circuit. Alternatively, logic synthesis and optimization tools 1010 may generate a gate-level netlist of the circuit design using gates of a targeted programmable IC (i.e., in the logic and interconnect resources of a particular programmable IC product or product family).

Logic synthesis and optimization tools 1010 may optimize the circuit design by making appropriate selections of hardware to implement different logic functions in the circuit design based on the circuit design data and constraint data entered by the logic designer using tools 1002. As an example, logic synthesis and optimization tools 1010 may perform multi-level logic optimization and technology mapping based on the length of a combinational path between registers in the circuit design and corresponding timing constraints that were entered by the logic designer using tools 1002.

After logic synthesis and optimization using tools 1010, the circuit design system 900 may use tools such as placement, routing, and physical synthesis tools 1012 to perform physical design steps (layout synthesis operations). Tools 1012 can be used to determine where to place each gate of the gate-level netlist produced by tools 1010. For example, if two counters interact with each other, tools 1012 may locate these counters in adjacent regions to reduce interconnect delays or to satisfy timing requirements specifying the maximum permitted interconnect delay. Tools 1012 create orderly and efficient implementations of circuit designs for any targeted integrated circuit (e.g., for a given programmable integrated circuit such as a field-programmable gate array (FPGA)).

Tools such as tools 1010 and 1012 may be part of a compiler suite (e.g., part of a suite of compiler tools provided by a programmable IC vendor). In certain embodiments, tools such as tools 1010, 1012, and 1014 may also include timing analysis tools, such as timing estimators, that use any of the embodiments disclosed herein with respect to FIGS. 1-6. The timing analysis tools allow tools 1010 and 1012 to satisfy performance requirements (e.g., timing requirements) before producing the integrated circuit.

After an implementation of the desired circuit design has been generated using tools 1012, the implementation of the design may be analyzed and tested using analysis tools 1014. For example, analysis tools 1014 may include timing analysis tools, power analysis tools, or formal verification tools, just to name few.

After satisfactory optimization operations have been completed using tools 1000 and depending on the targeted integrated circuit technology, tools 1000 may produce a mask-level layout description of the integrated circuit or configuration data for programming the programmable logic IC.

The following examples pertain to further embodiments. Example 1 is a method of using an integrated circuit design tool to analyze timing requirements of a circuit design for an integrated circuit, the method comprising: calculating a slack for a timing path in the circuit design that fails to satisfy a timing constraint; decomposing the slack for the timing path into categories of delays in the timing path, wherein a first one of the categories of delays is intrinsic margin that comprises a first edge of a first clock signal, a second edge of a second clock signal, a delay of a first sequential circuit responsive to the first clock signal, and a delay of a second sequential circuit responsive to the second clock signal; and providing a first set of optimizations for the intrinsic margin in response to a comparison between the intrinsic margin and a timing failure threshold indicating that the intrinsic margin is a factor in the failure to satisfy the timing constraint.

In Example 2, the method of Example 1 may optionally further comprise: providing profiles of the slack for an entirety of the circuit design in four of the categories of delays, wherein the four categories of delays comprise the intrinsic margin, clock skew, logic delay, and fabric interconnect delay.

In Example 3, the method of any one of Examples 1-2 may optionally further include, wherein a second one of the categories of delays is clock skew that comprises a delay for the first clock signal to reach the first sequential circuit and a delay for the second clock signal to reach the second sequential circuit, and wherein the method further comprises: providing a second set of optimizations for the clock skew in response to a comparison between the clock skew and the timing failure threshold indicating that the clock skew is a factor in the failure to satisfy the timing constraint.

In Example 4, the method of Example 3 may optionally include, wherein a third one of the categories of delays is logic delay that comprises a delay of logic circuits in the timing path and delays of local interconnect coupled to the logic circuits, and wherein the method further comprises: providing a third set of optimizations for the logic delay in response to a comparison between the logic delay and the timing failure threshold indicating that the logic delay is a factor in the failure to satisfy the timing constraint.

In Example 5, the method of Example 4 may optionally include, wherein a fourth one of the categories of delays is fabric interconnect delay comprising delays of non-local interconnect that couples together blocks of the logic circuits in the timing path, and wherein the method further comprises: providing a fourth set of optimizations for the fabric interconnect delay in response to a comparison between the fabric interconnect delay and the timing failure threshold indicating that the fabric interconnect delay is a factor in the failure to satisfy the timing constraint.

In Example 6, the method of any one of Examples 2-5 may optionally further comprise: providing values for the intrinsic margin, the clock skew, the logic delay, and the fabric interconnect delay in a report in a user interface.

In Example 7, the method of any one of Examples 1-6 may optionally include, wherein the first set of optimizations for the intrinsic margin comprise adjusting user or software constraints for the circuit design, ensuring endpoint circuit blocks of the timing path are configured and registered properly, and investigating sources of the first and second clock signals.

In Example 8, the method of any one of Examples 3-5 may optionally include, wherein the second set of optimizations for the clock skew comprise adjusting clock region assignments for the first and second clock signals and redesigning transfers of signals in the timing path across domains of the first and second clock signals.

In Example 9, the method of any one of Examples 4-5 may optionally include, wherein the third set of optimizations for the logic delay comprise adding pipeline stages to the timing path, restructuring logic circuits in the timing path, unblocking register retiming optimizations in the timing path, and restructuring register-transfer level of the circuit design to reduce levels of logic.

In Example 10, the method of Example 5 may optionally include, wherein the fourth set of optimizations for the fabric interconnect delay comprise reducing routing congestion in the non-local interconnect, changing placement constraints for placing the blocks of the logic circuits during placement of the circuit design, and restructuring register-transfer level of the circuit design to enable tighter packing of the blocks of the logic circuits or the non-local interconnect using a hardware description language.

Example 11 is a non-transitory computer-readable storage medium comprising instructions stored thereon for causing a computer to execute a method for analyzing timing constraints of a circuit design for an integrated circuit using a design tool, the method comprising: calculating a slack for a timing path in the circuit design for the integrated circuit that fails to satisfy at least one of the timing constraints; separating the slack for the timing path into a first category of delays in the timing path and a second category of intrinsic margin delays in the timing path that comprise an edge of a first clock signal, an edge of a second clock signal, an uncertainty in the second clock signal, a delay for a first sequential circuit responsive to the first clock signal, and a delay for a second sequential circuit responsive to the second clock signal; and providing first optimization suggestions for the intrinsic margin delays in response to a comparison between the intrinsic margin delays and a threshold indicating that at least one of the intrinsic margin delays is a cause of the failure to satisfy the at least one of the timing constraints.

In Example 12, the non-transitory computer-readable storage medium of Example 11 may optionally include, wherein the first category of delays in the timing path is clock skew delays that comprise a delay for the first clock signal to reach the first sequential circuit and a delay for the second clock signal to reach the second sequential circuit, and wherein the method further comprises: providing second optimization suggestions for the clock skew delays in response to a comparison between the clock skew delays and the threshold indicating that at least one of the clock skew delays is a cause of the failure to satisfy the at least one of the timing constraints.

In Example 13, the non-transitory computer-readable storage medium of Example 11 may optionally include, wherein the first category of delays in the timing path is logic delay that comprises a delay of logic circuits in the timing path and delays of local interconnect coupled to the logic circuits, and wherein the method further comprises: providing second optimization suggestions for the logic delay in response to a comparison between the logic delay and the threshold indicating that the logic delay is a cause of the failure to satisfy the at least one of the timing constraints.

In Example 14, the non-transitory computer-readable storage medium of Example 11 may optionally include, wherein the first category of delays in the timing path is fabric interconnect delay comprising delays of non-local interconnect that couples together blocks of logic circuits in the timing path, and wherein the method further comprises: providing second optimization suggestions for the fabric interconnect delay in response to a comparison between the fabric interconnect delay and the threshold indicating that the fabric interconnect delay is a cause of the failure to satisfy the at least one of the timing constraints.

In Example 15, the non-transitory computer-readable storage medium of claim 11 may optionally include, wherein the method further comprises: providing profiles of the slack for an entirety of the circuit design in the first category, the second category, a third category of delays, and a fourth category of delays, wherein the first category of delays is clock skew, the second category is the intrinsic margin delays, the third category of delays is logic delay, and the fourth category of delays is fabric interconnect delay.

Example 16 is a circuit design system configured to implement a circuit design tool for analyzing timing requirements of a circuit design for an integrated circuit, the circuit design system comprising: a timing analysis tool for calculating a slack for a timing path in the circuit design that fails to satisfy a timing constraint; wherein the timing analysis tool separates the slack for the timing path into first and second categories of delays in the timing path, wherein the first category is intrinsic margin that comprises a delay of a first clock signal, a delay of a second clock signal, a delay for a first sequential circuit that receives the first clock signal, and a delay for a second sequential circuit that receives the second clock signal; and a design and constraint entry tool for providing first optimization suggestions for the intrinsic margin in response to a comparison between the intrinsic margin and a threshold indicating that the intrinsic margin influences the failure to satisfy the timing constraint.

In Example 17, the circuit design system of Example 16 may optionally include, wherein the second category of delays in the timing path is clock skew that comprises a delay for the first clock signal to reach the first sequential circuit and a delay for the second clock signal to reach the second sequential circuit, and wherein the design and constraint entry tool provides second optimization suggestions for the clock skew in response to a comparison between the clock skew and the threshold indicating that the clock skew influences the failure to satisfy the timing constraint.

In Example 18, the circuit design system of any one of Examples 16-17 may optionally include, wherein the timing analysis tool separates the slack for the timing path into the first, the second, and third categories of delays in the timing path, wherein the third category is logic delay that comprises a delay of logic circuits in the timing path and delays of local interconnect coupled to the logic circuits, and wherein the design and constraint entry tool provides third optimization suggestions for the logic delay in response to a comparison between the logic delay and the threshold indicating that the logic delay influences the failure to satisfy the timing constraint.

In Example 19, the circuit design system of Example 18 may optionally include, wherein the timing analysis tool separates the slack for the timing path into the first, the second, the third, and fourth categories of delays in the timing path, wherein the fourth category is fabric interconnect delay comprising delays of non-local interconnect that couples together blocks of the logic circuits in the timing path, wherein the design and constraint entry tool provides fourth optimization suggestions for the fabric interconnect delay in response to a comparison between the fabric interconnect delay and the threshold indicating that the fabric interconnect delay influences the failure to satisfy the timing constraint.

In Example 20, the circuit design system of any one of Examples 16-19 may optionally include, wherein the timing analysis tool provides profiles of the slack for an entirety of the circuit design in the first category of delays, the second category of delays, a third category of delays, and a fourth category of delays, wherein the second category of delays is clock skew, the third category of delays is logic delay, and the fourth category of delays is fabric interconnect delay.

The foregoing description of the exemplary embodiments has been presented for the purpose of illustration. The foregoing description is not intended to be exhaustive or to be limiting to the examples disclosed herein. The foregoing is merely illustrative of the principles of this disclosure and various modifications can be made by those skilled in the art. The foregoing embodiments may be implemented individually or in any combination.

What is claimed is:

1. A method of using an integrated circuit design tool to analyze timing requirements of a circuit design for an integrated circuit, the method comprising:
    calculating a slack for a timing path in the circuit design that fails to satisfy a timing constraint;
    decomposing the slack for the timing path into categories of delays in the timing path, wherein a first one of the categories of delays is intrinsic margin that comprises a delay of a first sequential circuit responsive to a first clock signal and a delay of a second sequential circuit responsive to a second clock signal; and
    providing a first set of optimizations for the intrinsic margin in response to a comparison between the intrinsic margin and a timing failure threshold indicating that the intrinsic margin is a factor in a failure to satisfy the timing constraint.

2. The method of claim 1 further comprising:
    providing profiles of the slack for an entirety of the circuit design in four of the categories of delays, wherein the four categories of delays comprise the intrinsic margin, clock skew, logic delay, and fabric interconnect delay.

3. The method of claim 1, wherein a second one of the categories of delays is clock skew that comprises a delay for the first clock signal to reach the first sequential circuit and a delay for the second clock signal to reach the second sequential circuit, and wherein the method further comprises:
    providing a second set of optimizations for the clock skew in response to a comparison between the clock skew and the timing failure threshold indicating that the clock skew is a factor in the failure to satisfy the timing constraint.

4. The method of claim 3, wherein a third one of the categories of delays is logic delay that comprises a delay of logic circuits in the timing path and delays of local interconnect coupled to the logic circuits, and wherein the method further comprises:
    providing a third set of optimizations for the logic delay in response to a comparison between the logic delay and the timing failure threshold indicating that the logic delay is a factor in the failure to satisfy the timing constraint.

5. The method of claim 4, wherein a fourth one of the categories of delays is fabric interconnect delay comprising delays of non-local interconnect that couples together blocks of the logic circuits in the timing path, and wherein the method further comprises:
    providing a fourth set of optimizations for the fabric interconnect delay in response to a comparison between the fabric interconnect delay and the timing failure threshold indicating that the fabric interconnect delay is a factor in the failure to satisfy the timing constraint.

6. The method of claim 5 further comprising:
    providing values for the intrinsic margin, the clock skew, the logic delay, and the fabric interconnect delay in a report in a user interface.

7. The method of claim 1, wherein the first set of optimizations for the intrinsic margin comprise adjusting user or software constraints for the circuit design, ensuring endpoint circuit blocks of the timing path are configured and registered, and investigating sources of the first and second clock signals.

8. The method of claim 3, wherein the second set of optimizations for the clock skew comprise adjusting clock region assignments for the first and second clock signals and redesigning transfers of signals in the timing path across domains of the first and second clock signals.

9. The method of claim 4, wherein the third set of optimizations for the logic delay comprise adding pipeline stages to the timing path, restructuring the logic circuits in the timing path, unblocking register retiming optimizations in the timing path, and restructuring register-transfer level of the circuit design to reduce levels of logic.

10. The method of claim 5, wherein the fourth set of optimizations for the fabric interconnect delay comprise reducing routing congestion in the non-local interconnect, changing placement constraints for placing the blocks of the logic circuits during placement of the circuit design, and restructuring register-transfer level of the circuit design to enable tighter packing of the blocks of the logic circuits or the non-local interconnect using a hardware description language.

11. A non-transitory computer-readable storage medium comprising instructions stored thereon for causing a computer to execute a method for analyzing timing constraints of a circuit design for an integrated circuit using a design tool, the method comprising:
calculating a slack for a timing path in the circuit design for the integrated circuit that fails to satisfy at least one of the timing constraints;
separating the slack for the timing path into intrinsic margin delays in the timing path that comprise an edge of a first clock signal, an edge of a second clock signal, and a delay for a first sequential circuit responsive to the first clock signal; and
providing first optimization suggestions for the intrinsic margin delays in response to a comparison between the intrinsic margin delays and a threshold indicating that at least one of the intrinsic margin delays is a cause of a failure to satisfy the at least one of the timing constraints.

12. The non-transitory computer-readable storage medium of claim 11 further comprising:
separating the slack for the timing path into clock skew delays that comprise a delay for the first clock signal to reach the first sequential circuit and a delay for the second clock signal to reach a second sequential circuit; and
providing second optimization suggestions for the clock skew delays in response to a comparison between the clock skew delays and the threshold indicating that at least one of the clock skew delays is a cause of the failure to satisfy the at least one of the timing constraints.

13. The non-transitory computer-readable storage medium of claim 11 further comprising:
separating the slack for the timing path into logic delay that comprises a delay of logic circuits in the timing path and delays of local interconnect coupled to the logic circuits; and
providing second optimization suggestions for the logic delay in response to a comparison between the logic delay and the threshold indicating that the logic delay is a cause of the failure to satisfy the at least one of the timing constraints.

14. The non-transitory computer-readable storage medium of claim 11 further comprising:
separating the slack for the timing path into fabric interconnect delay comprising delays of non-local interconnect that couples together blocks of logic circuits in the timing path; and
providing second optimization suggestions for the fabric interconnect delay in response to a comparison between the fabric interconnect delay and the threshold indicating that the fabric interconnect delay is a cause of the failure to satisfy the at least one of the timing constraints.

15. The non-transitory computer-readable storage medium of claim 11, wherein the method further comprises:
providing profiles of the slack for an entirety of the circuit design in a first category of delays, a second category of delays, a third category of delays, and a fourth category of delays, wherein the first category of delays is clock skew, the second category of delays is the intrinsic margin delays, the third category of delays is logic delay, and the fourth category of delays is fabric interconnect delay.

16. A circuit design system configured to implement a circuit design tool for analyzing timing requirements of a circuit design for an integrated circuit, the circuit design system comprising:
a timing analysis tool for calculating a slack for a timing path in the circuit design that fails to satisfy a timing constraint;
wherein the timing analysis tool separates the slack for the timing path into a first category of delays in the timing path, wherein the first category of delays comprises a delay for a first sequential circuit that receives a first clock signal and a delay for a second sequential circuit that receives a second clock signal; and
a design and constraint entry tool for providing first optimization suggestions for the first category of delays in response to a comparison between the first category of delays and a threshold indicating that the first category of delays influences a failure to satisfy the timing constraint.

17. The circuit design system of claim 16, wherein the timing analysis tool separates the slack for the timing path into the first category of delays and a second category of delays in the timing path, wherein the second category of delays is clock skew that comprises a delay for the first clock signal to reach the first sequential circuit and a delay for the second clock signal to reach the second sequential circuit, and
wherein the design and constraint entry tool provides second optimization suggestions for the clock skew in response to a comparison between the clock skew and the threshold indicating that the clock skew influences the failure to satisfy the timing constraint.

18. The circuit design system of claim 17, wherein the timing analysis tool separates the slack for the timing path into the first, the second, and third categories of delays in the timing path, wherein the third category is logic delay that comprises a delay of logic circuits in the timing path and delays of local interconnect coupled to the logic circuits, and
wherein the design and constraint entry tool provides third optimization suggestions for the logic delay in response to a comparison between the logic delay and the threshold indicating that the logic delay influences the failure to satisfy the timing constraint.

19. The circuit design system of claim 18, wherein the timing analysis tool separates the slack for the timing path into the first, the second, the third, and fourth categories of delays in the timing path, wherein the fourth category is fabric interconnect delay comprising delays of non-local interconnect that couples together blocks of the logic circuits in the timing path,
wherein the design and constraint entry tool provides fourth optimization suggestions for the fabric interconnect delay in response to a comparison between the fabric interconnect delay and the threshold indicating that the fabric interconnect delay influences the failure to satisfy the timing constraint.

20. The circuit design system of claim 16, wherein the timing analysis tool provides profiles of the slack for an entirety of the circuit design in the first category of delays, a second category of delays, a third category of delays, and a fourth category of delays, wherein the second category of delays is clock skew, the third category of delays is logic delay, and the fourth category of delays is fabric interconnect delay.

\* \* \* \* \*